US010067158B2

(12) United States Patent
Sadeghian Marnani et al.

(10) Patent No.: US 10,067,158 B2
(45) Date of Patent: Sep. 4, 2018

(54) SYSTEM AND METHOD OF PERFORMING SCANNING PROBE MICROSCOPY ON A SUBSTRATE SURFACE

(71) Applicant: Nederlandse Organisatie voor toegepast-natuurwetenschappelijk onderzoek TNO, 's-Gravenhage (NL)

(72) Inventors: Hamed Sadeghian Marnani, 's-Gravenhage (NL); Jasper Winters, 's-Gravenhage (NL); William Edward Crowcombe, 's-Gravenhage (NL); Teunis Cornelis van den Dool, 's-Gravenhage (NL); Geerten Frans Ijsbrand Kramer, 's-Gravenhage (NL)

(73) Assignee: Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/322,969

(22) PCT Filed: Jul. 3, 2015

(86) PCT No.: PCT/NL2015/050487
§ 371 (c)(1),
(2) Date: Dec. 29, 2016

(87) PCT Pub. No.: WO2016/003281
PCT Pub. Date: Jan. 7, 2016

(65) Prior Publication Data
US 2017/0131323 A1 May 11, 2017

(30) Foreign Application Priority Data
Jul. 4, 2014 (EP) ..................................... 14175830

(51) Int. Cl.
*G01Q 10/04* (2010.01)
*G01Q 10/06* (2010.01)
(Continued)

(52) U.S. Cl.
CPC ............. *G01Q 10/04* (2013.01); *G01Q 10/06* (2013.01); *G01Q 70/02* (2013.01); *B82Y 35/00* (2013.01); *G01Q 70/06* (2013.01)

(58) Field of Classification Search
USPC ................................................... 850/3, 2, 4
See application file for complete search history.

(56) References Cited

U.S. PATENT DOCUMENTS 4,390,172 A 6/1983 Gotman
4,976,043 A * 12/1990 Bieg .................... G01B 5/0002
33/545

(Continued)

FOREIGN PATENT DOCUMENTS

DE 3829022 A1 3/1989
DE 102012108707 A1 5/2014
(Continued)

OTHER PUBLICATIONS

Giesen et al., "Design Guidelines for Thermal Stability in Opto-Mechanical Instruments," ResearchGate 2003, Article in Proceedings of SPIE—The International Society for Optical Engineering, Oct. 2003.

*Primary Examiner* — Phillip A Johnston
(74) *Attorney, Agent, or Firm* — Hoffmann & Baron, LLP

(57) ABSTRACT

The invention is directed at a method of performing scanning probe microscopy on a substrate surface using a scanning probe microscopy system, the system including at least one probe head, the probe head comprising a probe tip arranged on a cantilever and a tip position detector for determining a position of the probe tip along a z-direction
(Continued)

transverse to an image plane, the method comprising: positioning the at least one probe head relative to the substrate surface; moving the probe tip and the substrate surface relative to each other in one or more directions parallel to the image plane for scanning of the substrate surface with the probe tip; and determining the position of the probe tip with the tip position detector during said scanning for mapping nanostructures on the substrate surface; wherein said step of positioning is performed by placing the at least one probe head on a static carrier surface.

13 Claims, 5 Drawing Sheets

(51) Int. Cl.
*G01Q 70/02* (2010.01)
*B82Y 35/00* (2011.01)
*G01Q 70/06* (2010.01)

(56) References Cited

U.S. PATENT DOCUMENTS

| | | | | |
|---|---|---|---|---|
| 5,345,690 | A * | 9/1994 | McMurtry | G01B 5/012 33/558 |
| 5,376,790 | A | 12/1994 | Linker et al. | |
| 7,640,674 | B2 * | 1/2010 | Ferrari | G01B 21/042 33/502 |
| 7,908,757 | B2 * | 3/2011 | Ferrari | G01B 5/012 33/503 |
| 9,476,908 | B2 * | 10/2016 | Van Den Braber | G01Q 10/06 |
| 9,528,824 | B2 * | 12/2016 | Bos | G01B 21/04 |

FOREIGN PATENT DOCUMENTS

| | | |
|---|---|---|
| EP | 2682759 A1 | 1/2014 |
| WO | 2007121208 A2 | 10/2007 |

* cited by examiner

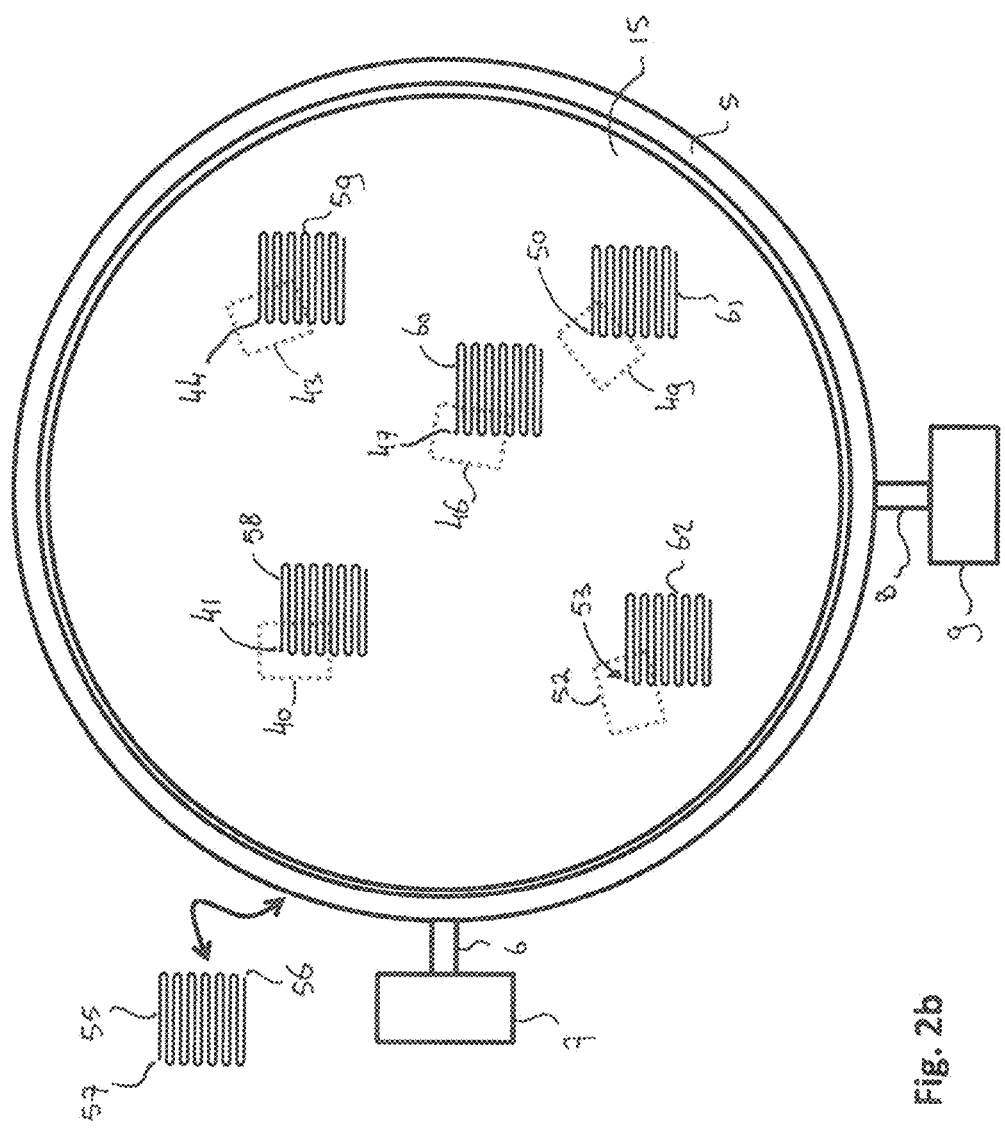

SYSTEM AND METHOD OF PERFORMING SCANNING PROBE MICROSCOPY ON A SUBSTRATE SURFACE

This application is the U.S. National Phase of, and Applicants claim priority from, International Patent Application Number PCT/NL2015/050487 filed 3 Jul. 2015, which claims priority from EP 14175830.0 filed 4 Jul. 2014, each of which is incorporated herein by reference.

FIELD OF THE INVENTION

The present invention is directed at a method of performing scanning probe microscopy on a substrate surface using a scanning probe microscopy system, the system including at least one probe head, the probe head comprising a probe tip arranged on a cantilever and a tip position detector for determining a position of the probe tip along a z-direction transverse to an image plane, the method comprising positioning the at least one probe head relative to the substrate surface.

The invention is further directed at a scanning probe microscopy system for performing microscopy on a substrate surface, the system including at least one probe head, the probe head comprising a probe tip arranged on a cantilever and a tip position detector for determining a position of the probe tip along a z-direction transverse to an image plane, wherein the system comprises a positioning structure for positioning the at least one probe head relative to the substrate surface.

BACKGROUND

Scanning probe microscopy (SPM) devices, such as atomic force microscopy (AFM) devices, are for example applied in the semiconductor industry for scanning of semiconductor topologies on a surface. Other uses of this technology are found in biomedical industry, nanotechnology, and scientific applications. In particular, AFM may be used for critical dimension metrology (CD-metrology), particle scanning, stress- and roughness measurements. AFM microscopy allows visualization of surfaces at very high accuracy, enabling visualization of surface elements at sub-nanometer resolution.

As a result of the high accuracy, conventional and available SPM devices are to be controlled precisely, and contain accurate and sensitive measuring equipment, as well as positioning and scanning equipment arranged for supporting the very high (e.g. sub-nanometer) resolution. Correct calibration of the device parts and the use of a high resolution positioning feedback system enable the SPM device to provide the required accuracy, although all these measures come at a cost.

A disadvantage, for example, is that SPM devices are usually limited to inspection of relatively small substrate surfaces. This is because it is much more easy to obtain the required accuracy with a positioning structure having a small stroke (e.g. enabling to move the probe head across a distance of e.g. 10 cm) than to obtain the same accuracy with a positioning system having a large stroke (enabling to move the probe head across a distance of e.g. 100 cm). This is because the positioning and metrology loops are typically much larger for systems with large strokes. A larger positioning loop means more compliance in actuated parts and loss of accuracy. A larger metrology loop means more compliance in general and therefore more vulnerability to disturbances.

SUMMARY OF THE INVENTION

It is an object of the present invention to provide a method of performing scanning probe microscopy that overcomes the aforementioned disadvantages and enables to be applied to large substrate surfaces without trade-off in terms of accuracy.

To this end, there is provided herewith a method of performing scanning probe microscopy on a substrate surface using a scanning probe microscopy system, the system including at least one probe head, the probe head comprising a probe tip arranged on a cantilever and a tip position detector for determining a position of the probe tip along a z-direction transverse to an image plane, the method comprising: positioning the at least one probe head relative to the substrate surface; moving the probe tip and the substrate surface relative to each other in one or more directions parallel to the image plane for scanning of the substrate surface with the probe tip; and determining the position of the probe tip with the tip position detector during said scanning for mapping nanostructures on the substrate surface; wherein said step of positioning is performed by placing the at least one probe head on a static carrier surface.

In accordance with the method of the present invention, prior to scanning the substrate surface for performing the imaging itself, the probe head is positioned relative to the substrate surface at a desired location for imaging. This step of positioning is performed by placing the at least one probe head on a static carrier surface. The term 'static carrier surface' is to be interpreted as a carrier surface that does not move with respect to the scanning probe microscopy system. For example, the static carrier surface could be a static surface of the metrology frame of the system. By placing the at least one probe head on the static carrier surface, the probe head is mechanically fixed with respect to this surface. Because the static carrier surface is a surface which is static (i.e. does not move) with respect to the microscope system, fixing the location of the at least one probe head by placing it on the static carrier surface automatically fixes the position of the probe head in the microscopy system. This enables to determine the relative position of the probe head with respect to the substrate surface to be determined accurately. Moreover, the placing of the at least one probe head on the static carrier surface provides the probe head with a higher stability during scanning.

In accordance with an embodiment of the present invention, the step of positioning includes moving the probe head relative to the substrate surface in a direction parallel to the image plane towards a landing position using a positioning structure, wherein upon said placing of the probe head on the static carrier surface, said probe head is released from said positioning structure.

The positioning structure may for example be a positioning arm or an extendible arm which enables to move the probe head (or multiple probe heads simultaneously or consecutively) relative to the substrate surface towards desired landing position. The length of the positioning structure across the surface is no longer a limited factor, because in accordance with the present invention the probe head is first placed on the static carrier surface prior to scanning of the substrate surface with the probe. Therefore, whether the extendible arm is only five centimeters long or 80 centimeters long does not matter; the length of the arm and any vibrations caused by limited stiffness of the material or play in the suspension system, or any inaccuracy caused by actuator accuracy (whether or not multiplied by the length of the arm) no longer contributes to the accuracy of the microscopy method. Once the probe head is placed on the static carrier surface, the probe head is stabilized by being fixed (e.g. by gravity and/or any further fixing force) to the surface. Moreover, because the probe head is released from the positioning structure, any vibrations or thermal effects in the structure that may cause variations in the positioning of the arm are not transferred to the probe head. By releasing the probe head, there is no longer a mechanical coupling between the probe head and the positioning structure, and together with the placing of the probe head on the static carrier surface, highly accurate microscopy system is obtained.

Yet in accordance with a further embodiment, the static carrier surface is at least one of a group comprising: a surface of a metrology frame, a surface that is statically connected to a metrology frame, and/or a two-dimensional optical encoder surface. In accordance with a preferred embodiment of the present invention, the static carrier surface is a two-dimensional optical encoder surface that is fixed to a metrology frame of the microscopy system. The two-dimensional optical encoder surface is designed for being absolutely static relatively to the metrology frame of the microscopy system. Moreover, the two-dimensional optical encoder surface is accurately calibrated such that it provides a highly reliable reference frame that can be used during scanning of the substrate surface. The two-dimensional optical encoder surface may comprise single encoder surface element, or may be formed of a plurality of surface elements that are arranged contiguously such as to span a larger surface.

An optical encoder surface may comprise an optical grating that cooperates with an encoder device on the (at least one) probe. The encoder enables to determine the exact position of the probe head based on the regular structure of the grating. Such a grating surface is usually a highly sensitive surface, and any irregularities, such as even the smallest scratches or contaminations, may cause the grating surface to be no longer usable. For example, the encoder uses the regular structure of the grating as a reference, by counting the grating structures that have passed during movement of the encoder starting from a specific reference. Any irregularity may disrupt such counting, thereby destroying the accuracy of the reference.

The above preferred embodiment, wherein the two-dimensional encoder surfaces used as a static carrier surface for placing of the at least one probe head, is based on the insight that for providing the required accuracy, the two-dimensional optical encoder surface must be statically fixed to the scanning probe microscopy system, whereas the optical encoder surface further directly provides a highly accurate positioning reference. Using the two-dimensional optical encoder surface as a static carrier surface, the at least one probe head can be effectively stabilized while at the same time its position on the encoder surface is exactly known. However, given the sensitivity of some two-dimensional optical encoder surfaces (such as the grating surface referred to above), a placement method is required that enables to place the probe head accurately and gently on the surface, such as to prevent any scratching during placement of the probe head on the two-dimensional optical encoder surface. Therefore, in accordance with a further embodiment, placing of the at least one probe head is performed by a positioning structure, wherein the or each probe head comprises a carrier cooperating with the positioning structure, said carrier or carriers comprising an upper part and a base which are connected to each other such as to be arranged remote from each other, wherein the positioning structure comprises a support surface arranged between the base and the upper part, the upper part comprising three engagement elements extending towards the support surface, wherein the base comprises three landing elements, each landing element being associated with a respective one of the three engagement elements, and wherein prior to placement the three engagement elements rest on a plurality of sockets forming a kinematic mount on the support surface, wherein during placement of the or each probe head the landing elements are consecutively placed onto the static carrier surface such that each one of the engagement elements is released from the kinematic mount upon touch down of its associated landing element. The engagement elements may be pillars, legs or any other suitable structures that allow engagement with the sockets of the kinematic mount. Preferably, the engagement elements have spherical or semi-spherical, cone type or ball type feet. In embodiments described, the engagement elements will mostly be embodied as pillars, although other structures may be likewise applied.

In the above embodiment, the probe head can be placed on the static carrier surface (e.g. the two-dimensional encoder surface) very carefully and gently, and any scratching of the surface can be effectively prevented by making use of the kinematic mount during facing of the carrier of the probe head. During landing, at every stage during the placing of each of the landing elements of the at least one probe head, exactly only those degrees of freedom are constraint by the kinematic mount that need to be constraint to prevent scratching.

If the probe head would be placed on the static carrier surface without considering which degrees of freedom would have to be constraint when, the risk of scratching of the surface would be elevated. For example, for placing the first of the landing elements on the static carrier surface, the degrees of freedom of translation parallel to the static carrier surface must be fixed for the first landing element to prevent scratching of the landing element of the surface. For the second landing element, constraining too many degrees of freedom would increase the risk that during landing of the second landing element the first landing element or the second landing element would cause a scratch on the surface due to over constraining. The same holds for placement of the third landing element. Using the kinematic mount, each of the degrees of freedom that needs to be constrained, can be constrained effectively by the three engagement elements cooperating with the sockets and the support surface forming the kinematic mount.

Upon contact of the static carrier surface of each of the three landing elements, the associated engagement element with that particular landing element is to be released from the kinematic mount to prevent over constraining in the next stage of the landing procedure. To remove the probe head from the static carrier surface without scratching, the placement method is performed in exactly the reversed order: first the third landing element is lifted while re-engaging the third engagement element with the support surface, then the second landing element is lifted while re-engaging the second engagement element with the second socket of the kinematic mount, and last the first landing element is lifted while re-engaging the first engagement element with the first socket of the kinematic mount.

A kinematic mount type which appears to be most suitable for effectively constraining the required degrees of freedom during landing, is a Kelvin clamp type kinematic mount comprising a first socket which constrains the two degrees of freedom of translation parallel to the surface, and a second socket (usually a v-groove) that constrains, cooperating with the landing element already in contact with the static carrier surface, the degree of freedom of rotation around the axis through the first landing element. The third engagement element lands directly on the support surface: the kinematic mount does not include a third socket.

In accordance with a further embodiment of the present invention, the step of moving the probe tip and the substrate surface relative to each other is performed by the probe head comprising an actuator for moving the cantilever relative to the probe head in a direction parallel to the image plane for performing the scanning of the substrate surface. An actuator of this type only requires a very small stroke for spanning only the surface of the image to be made. Sufficiently accurate actuator systems are available for use in a method in accordance with this embodiment.

However, in accordance with yet a further preferred embodiment, the step of moving the probe tip and the substrate surface relative to each other is performed by moving the substrate surface in the direction parallel with the image plain while maintain the at least one probe head on the static carrier surface. This latter embodiment requires only the substrate holder of a microscopy system to be equipped with an accurate actuator for performing the scanning motion between the probe tip and the substrate surface. This dispenses with having to provide a miniaturized actuator system in the X and Y directions (i.e. parallel to the substrate surface) on the probe head or probe head carrier.

A plurality of probe heads may be placed at various locations relative to the substrate surface, and the substrate surface may be moved relative to these probe tips such as to perform the scanning motion. This enables to perform imaging in a plurality of different locations simultaneously. Because in this embodiment it is not necessary to equip each of the plurality of probe heads with an accurate actuator system for performing the scanning motion, the probe head can be designed compact, and the whole system may be manufactured at relatively low cost while providing a high throughput by enabling imaging at multiple locations on the substrate surface at the same time. In combination with the placing of the at least one probe head on the static carrier surface, and the releasing of these probe heads from the positioning structure, imaging of the substrate surface in many locations at the same time becomes possible without positioning structures for different probe heads interfering with each other.

In accordance with yet a further embodiment of the present invention, for placement of the at least one probe head onto the static carrier surface, the at least one probe head comprises one or more landing elements, wherein the landing elements comprise at least one of a group comprising: landing feet, suction force clamps, magnetic clamps, or electrostatic clamps. Landing feet may simply allow positioning of the at least one probe head onto the static carrier surface by means of gravity only. In this embodiment, the static carrier surface may be located underneath the substrate surface, and the substrate surface to be imaged faces the static carrier surface, having the at least one probe head in between the static carrier surface and the substrate surface. In addition to only fixing the landing elements to the static carrier surface by means of gravity, additional fixing force may be applied for example by using suction force clamps, magnetic clamps, or electrostatic clamps. Moreover, in other embodiments of the invention, the static carrier surface may be located above the substrate surface, having the substrate surface facing upwards towards the static carrier surface. In such an embodiment, gravity works against keeping the probe heads on the static carrier surface, and therefore use of suction force clamps, magnetic clamps or electrostatic clamps in such an embodiment is necessary such as to allow the probe heads to be fixed to the static carrier surface.

In accordance with a second aspect of the present invention, there is provided a scanning probe microscopy system for performing microscopy on a substrate surface, the system including at least one probe head, the probe head comprising a probe tip arranged on a cantilever and a tip position detector for determining a position of the probe tip along a z-direction transverse to an image plane, wherein the system comprises a positioning structure for positioning the at least one probe head relative to the substrate surface, wherein the system is further arranged for moving the probe tip and the substrate surface relative to each other in one or more directions parallel to the image plane for scanning of the substrate surface with the probe tip, and the system comprising a controller for receiving a signal provided by the tip position detector for determining the position of the probe tip with the tip position detector during said scanning for mapping nanostructures on the substrate surface, wherein for positioning of the at least one probe head, the positioning structure is arranged for placing the at least one probe head on a static carrier surface. Specific embodiments of such a scanning probe microscopy system are described herein, and are referred to in the enclosed claims.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

FIG. 2b schematically illustrates the performing of a scanning action in a method of the present invention in the situation of FIG. 2a;

DETAILED DESCRIPTION

Figure 1:
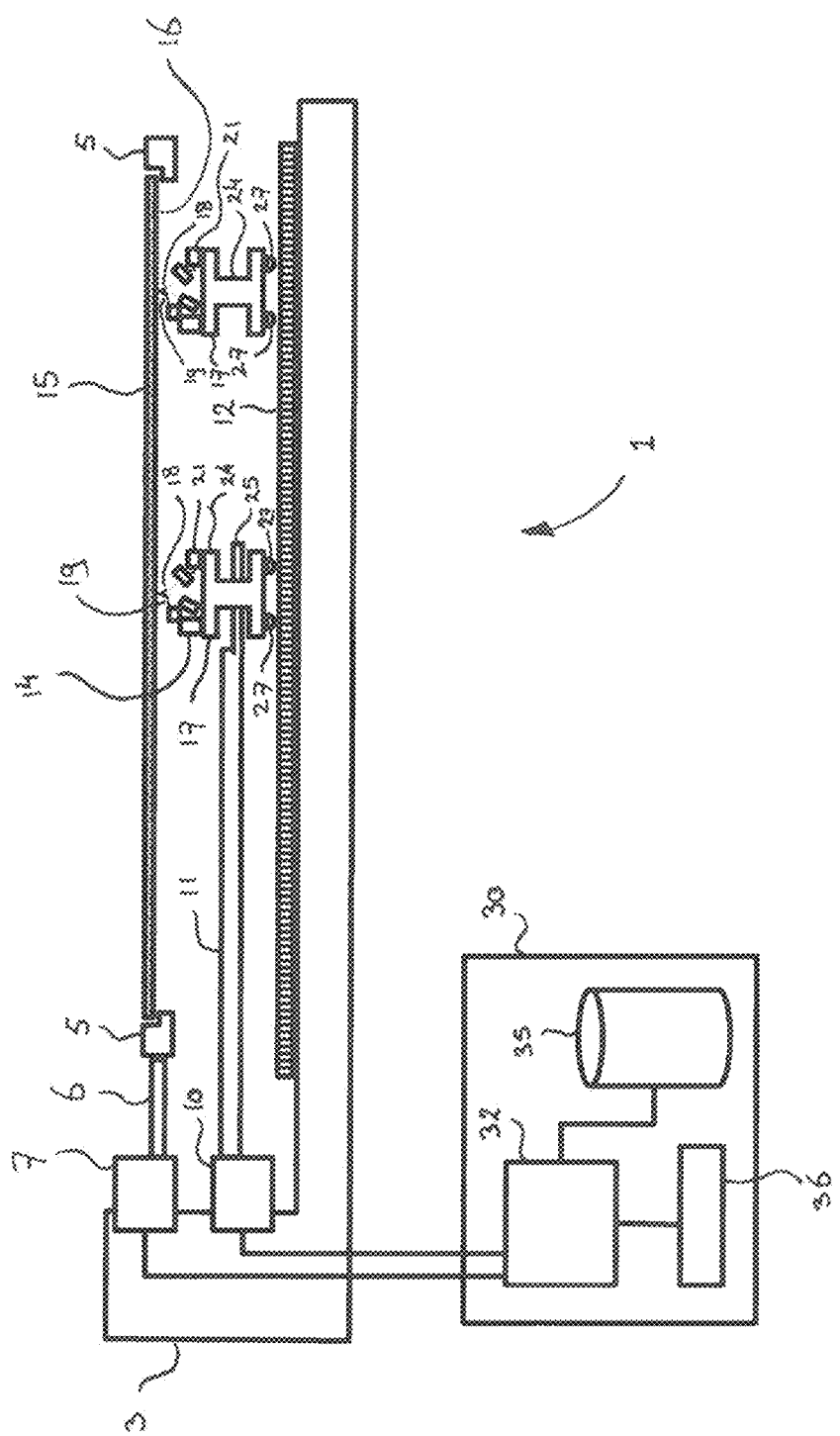
FIG. 1 schematically illustrates a scanning probe microscopy system in accordance with the present invention, wherein the method of the present invention may be applied.

FIG. 1 schematically illustrates a scanning probe microscopy (SPM) system 1 of the present invention. The SPM system 1 is suitable for being used in combination with the method of performing scanning probe microscopy in accordance with the present invention. The SPM system 1 comprises a metrology frame 3. The metrology frame provides a solid fixed base for the system. For obtaining the desired accuracy, the metrology frame is preferably kept free from any vibrations, and ideally also temperature changes within or in the environment of the metrology frame 3 are ruled out as much as possible.

Figure 2A:
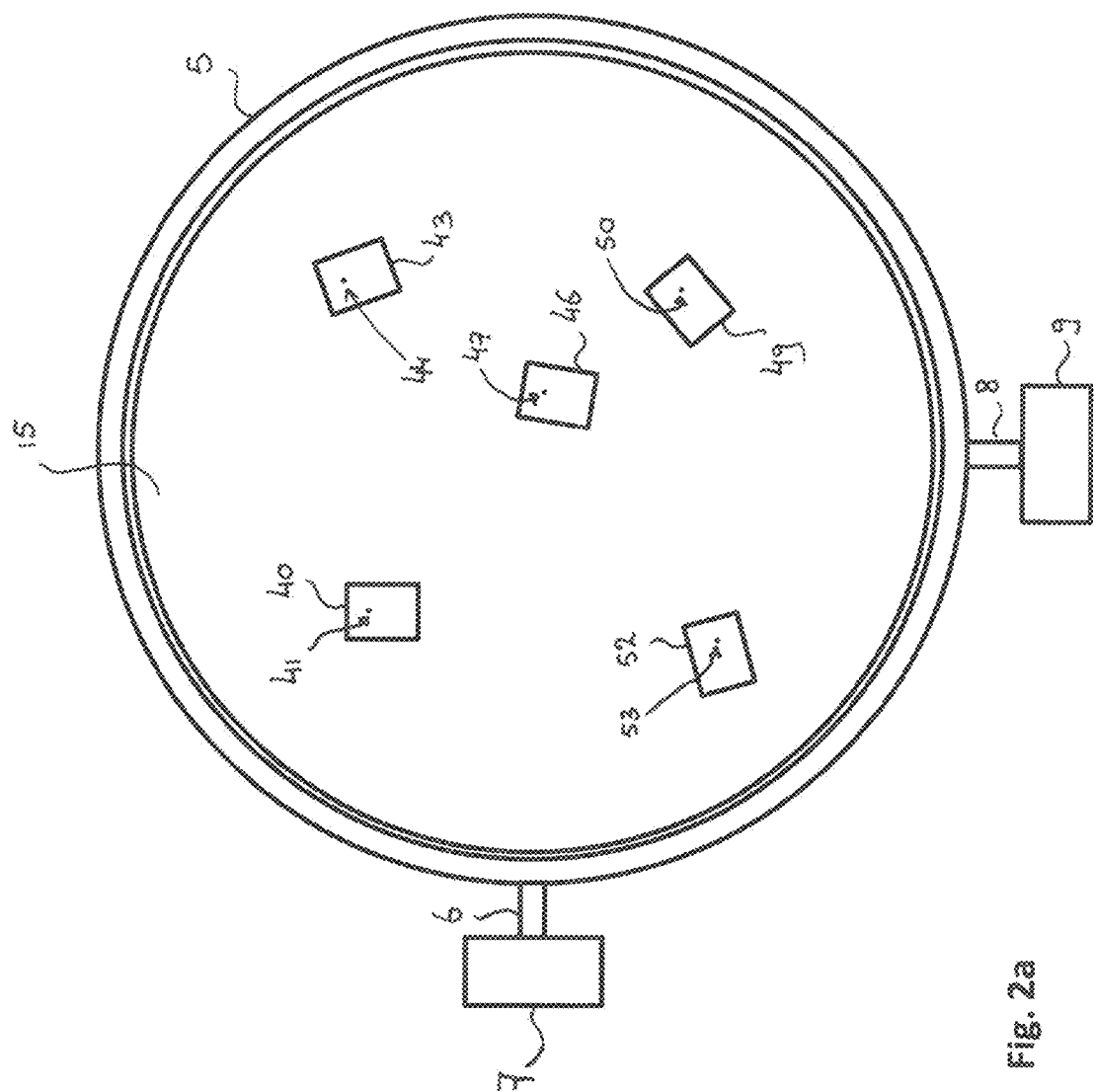
FIG. 2a schematically illustrates the placement of a plurality of probe heads in a scanning probe microscopy system of the present invention.

A substrate holder 5 for carrying a substrate 15 such as a wafer, is connected to an XY substrate holder actuator 7 by means of a substrate holder arm 6. The substrate holder actuator 7 may be a system that allows to move the substrate holder 5, and therewith the substrate 15, in the X and Y directions, i.e. the directions parallel to the substrate 15. In FIG. 1, the substrate holder actuator 7 is illustrated as a single actuator element. Although the skilled person may appreciate that the substrate holder actuator may be implemented in a number of different manners, allowing the X and Y movements to be performed by a single actuator; other manners of implementing the substrate holder actuator functionality may comprise two (or more) actuators. An example comprising two actuators is schematically illustrated in FIG. 2*a*, wherein in addition to substrate holder actuator 7 and substrate holder arm 6, a further substrate holder actuator 9 and a further substrate holder arm 8 are illustrated, both actuators 7 and 9 allowing to move the substrate holder 5 in perpendicular directions parallel to the substrate 15.

Back to FIG. 1, the substrate 15 comprises a substrate surface 16 that requires to be scanned by the scanning probe microscopy system 1. The scanning probe microscopy system 1 comprises a plurality of probe heads 17. The probe heads 17 may be placed at various locations relative to the substrate surface 16 using a positioning structure. The positioning structure comprises a positioning actuator 10 and an extendible arm 11. The extendible arm 11 comprises an engagement element 25 that can be used for engaging with a probe head 17 for placement thereof relative to the substrate surface.

The probe heads 17 comprise, to this end, a probe head carrier 24 that cooperates with the engagement element 25. The probe head carrier 24 for example comprises pillars that cooperate with a kinematic mount present on the engagement element 25; an example of this will be illustrated in FIG. 4. The probe head carrier 24 comprises the cantilever actuator 14 to which the probe comprising the cantilever 19 and the probe tip 18 are attached. The cantilever actuator 14 allows actuation of the probe in the Z direction, i.e. the direction perpendicular to substrate surface 16, preferably by means of the vibration of the probe tip 18 in the Z direction. During scanning, by vibrating the probe tip and bringing the probe tip very close to the substrate surface 16, the substrate surface 16 can be scanned and any nanostructures present on the substrate surface 16 will influence the deflection of the probe tip. This probe tip deflection is measured using a tip position detector 21 comprising an interferometer.

In accordance with a method of the present invention, during scanning of the substrate surface 16 the probe head 17 is placed on a static carrier surface. In FIG. 1, this is achieved by placing the probe head carrier 24 with its landing feet 27 on the encoder surface 12. The encoder surface 12 is a highly sensitive optical grating, which is accurately calibrated such as to provide a reference structure that is usable for accurately determining the exact position and orientation of the probe head 17 on the metrology frame 3. By having this information, also the exact position of the probe tip 19 with respect to the metrology frame is known. The encoder surface 12, for this reason, is highly sensitive and prone to any scratching or contamination. To determine the exact position on the metrology frame 3, a counting may be performed on the regular structure of the grating periodicity of the encoder surface 12. Instead of or in addition to counting grating structures, the encoder surface may comprise other references that may be interpreted for determining an exact position. As may be appreciated, a scratch on the surface may disrupt the interpretation of the positioning reference, and thereby introduces an inaccuracy in the reference system.

An encoder surface such as described hereinabove is usually considered not useable as a carrier surface for the placement of objects or structures thereon. This is because using the encoder surface for this purpose may cause the encoder surface to become damaged. However, because the encoder surface 12 is tightly fixed and supported by the metrology frame 3, and because it is accurately calibrated for its purpose, it is realized herewith that the encoder surface 12 also provides for a suitable static carrier surface for use in the method of the present invention. Therefore, by applying a highly accurate and gentle placement method for placing the probe head 17 onto the encoder surface, the encoder surface 12 can be used as the static carrier surface for performing the method of the present invention.

This is for example achieved with the probe head that is illustrated and described in relation to FIG. 4 below. This probe head construction uses a kinematic mount in the placement process wherein scratching is effectively prevented by preventing over constraining of the probe head during placement (further explained below in relation to FIG. 4). Therefore, prior to scanning of the substrate surface 16 using the probe tip 18 of each of the probe heads 17, the probe heads are placed onto the encoder surface 12 by means of the extendible arm 11 and the positioning actuator 10. Upon placement of the probe heads 17 with the landing feet 27 of the probe head carriers 24 placed on the encoder surface 12, engagement of the engagement element 25 and the probe head carrier is released for each of the probe heads 17 such that the probe heads 17 are only supported by the static carrier surface. The absence of a mechanical connection between the extendible arm 11 and the probe head carriers 24, prevent any vibrations or thermal mechanical effects within the extendible arm 11 from being carried onto the probe head 17. Moreover, by placement of each probe head 17 in this manner using an extendible arm 11 onto the encoder surface 12, it is possible to place a plurality of probe heads 17 on the surface 12 and to perform a plurality of scan actions simultaneously using the multiple probe heads 17.

Once the probe heads 17 are placed on the encoder surface 12, scanning of the substrate surface 16 with the probe tips 18 of each probe head 17 may commence. In FIG. 1, the substrate holder 5 is illustrated in the lowered position: in the position wherein the scanning of the substrate surface 16 by the probe tips 18 may take place. However during placement of the probe heads 17 on the encoder surface 12, the substrate holder 5 will be moved in an upward position such as to allow the placement of the heads 17 using the extendible arm 11.

Once the lowering of the substrate holder 5 has been performed accurately, the substrate holder 5 is moved in a scanning motion relative to the encoder surface 12 (and thereby the probe tips 18 of the probe heads 17), to perform the scanning of the substrate surface 16. Accurate control of all movements performed by the actuators 7, 9 (only illustrated in FIG. 2*a*) and 10 will be controlled by controller 32 of the scanning probe microscopy control system 30. The control system 30 further comprises a memory 35 and a communications module 36 both connected to the controller 32 in a functional manner. Data obtained using the tip position detectors 21 of each probe head 17 is communicated to the communications module 36 of the control system 30. This measurement data is stored in memory 35, or may be forwarded onto a communications network for further processing remotely. Communication between the communications module 36 and each of the tip position detectors may comprise a wireline connection (not shown) or a wireless data communication connection. As will be appreciated, for sending the data wirelessly, the probe head 17 may further comprise a wireless data communication module installed onboard.

FIG. 2a schematically illustrates a situation wherein, using a scanning probe microscopy system in accordance with the present invention, a plurality of probe heads 40, 43, 46, 49, and 52 is placed relative to a substrate 15 for allowing to scan the substrate surface. FIG. 2a is a schematic illustration, which illustrates the relative positions of each of the probe head underneath the substrate 15. The substrate surface 16 (not indicated with a reference numeral in FIG. 2a) faces the probe heads 40, 43, 46, 49 and 52. The dots that are indicated by reference numerals 41, 44, 47, 50 and 53 indicate the relative locations of the probe tips of each probe head 40, 43, 46, 49 and 52 respectively. The substrate 15 is held tightly by the substrate holder 5. Although the schematic illustrations of FIGS. 2a and 2b and also FIG. 1 suggest that there may be some play between the substrate 15 and the substrate holder 5, as will be appreciated for obtaining the required accuracy for performing the scanning probe microscopy, in reality no play will be present between the substrate 15 and the substrate 105. The substrate 105 can be moved in the two directions parallel to the substrate surface 16 by means of substrate holder actuators 7 and 9 operating the substrate holder arms 6 and 8 respectively.

The scanning motion performed during scanning of the scanning probe microscopy system illustrated in FIG. 2a is schematically illustrated in FIG. 2b. Using the substrate holder actuators 7 and 9, a scanning path 55 is followed with the substrate holder 5. The scanning path 55 starts in location 56 and ends in position 57. Thus, from position 56 the substrate holder 5 first is moved in FIG. 2b to the left across the first line of the scanning path. Because the probe heads 40, 43, 46, 49 and 52 are steadily placed on the static carrier surface of the metrology frame underneath the substrate 15, by moving the substrate holder across the scanning path 55, the probe tips 41, 44, 47, 50 and 52 of the probe heads will follow the relative paths 58, 59, 60, 61 and 62 respectively. Thus, each of the probe tips will relatively move to the right in the first line of scanning. When the substrate holder 5 moves upwards to the second line, the probe tips 41, 44, 47, 50 and 53 relatively move downwards as illustrated in FIG. 2b. As visualized in FIG. 2b, by applying the scanning motion 55 on the substrate holder 5, the substrate surface of substrate 15 may simultaneously be scanned in five different locations.

Figure 3:
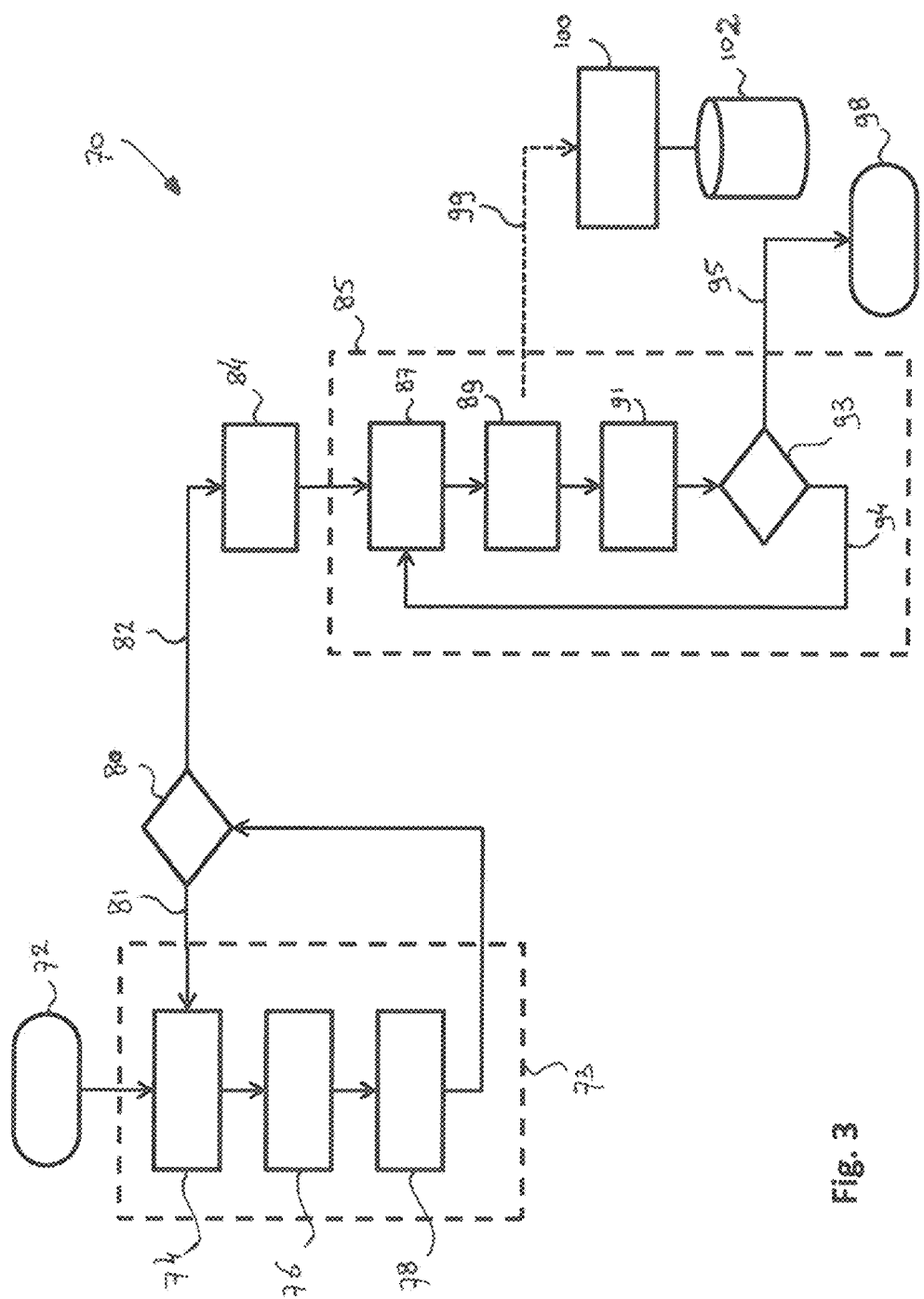
FIG. 3 schematically illustrates the method of the present invention.

FIG. 3 schematically illustrates a method in accordance with the present invention. The method 70 starts in 72. The method 70 starts with placement of one or more probe heads onto the static carrier surface in step 73. Step 73 consists of a number of consecutive steps 74, 76 and 78. In step 74, the probe head is moved relative to the substrate surface towards a desired landing position. In step 76, the probe head is placed onto the static carrier surface. Preferably, in case the static carrier surface is a delicate encoder surface as described above, for placement of the probe head onto the delicate encoder surface, a special placement method is used that applies the kinematic mount to prevent scratching on the surface. This is performed in step 76. Then, in step 78, the probe head is released from the positioning structure to prevent any vibrations or other movements to be carried over onto the probe head during the measurement. The method then moves to decision step 80, wherein it is decided whether or not all of the desired probe heads are placed relative to the substrate surface. In case another probe head needs to be positioned relative to the substrate surface, the method continues in branch 81 returning back to step 74. Positioning of a further probe head is then performed until the method is back in step 80. In case no further probe head is to be positioned relative to the substrate surface, the method continues in branch 82 towards step 84.

In step 84, all probe heads are placed relative to the substrate surface 16, however the substrate surface 16 cannot yet be scanned because it has to be lowered towards the location of the probe tips on each of the probe heads. Lowering of the substrate surface 16 towards the probe tip is performed in step 84. As will be appreciated, instead of lowering the substrate surface towards the probe tips of the probe head it is also possible to raise the static carrier surface carrying the probe heads towards the substrate surface. Yet another option is to use an extension element included by the probe head that enables to bring the probe tip towards the substrate surface, once placed on the static carrier surface.

After step 84, scanning of the surface of the substrate is performed in step 85. Step 85 consists of a number of substeps as explained below. In step 87, the probe tip deflection is measured using the tip position detector of the SPM system. Then, in step 89 the data obtained using the tip position detector 21 is send towards the SPM control system as illustrated by dotted line 99. The SPM control system meanwhile stores the data that is received in step 100 in a data storage facility 102. In step 91 of the scanning action, the probe tip is moved relative to the substrate surface to a next location across the scanning path. Then in step 93 it is determined whether or not the last position in the scanning path has already been reached. As may be appreciated, steps 91 and 93 may be reversed. If the last position has been reached, branch 95 is followed and the method ends in step 98. In case the scanning continues, branch 94 is followed and again in step 87 the probe tip deflection is measured using the tip position detectors.

Figure 4:
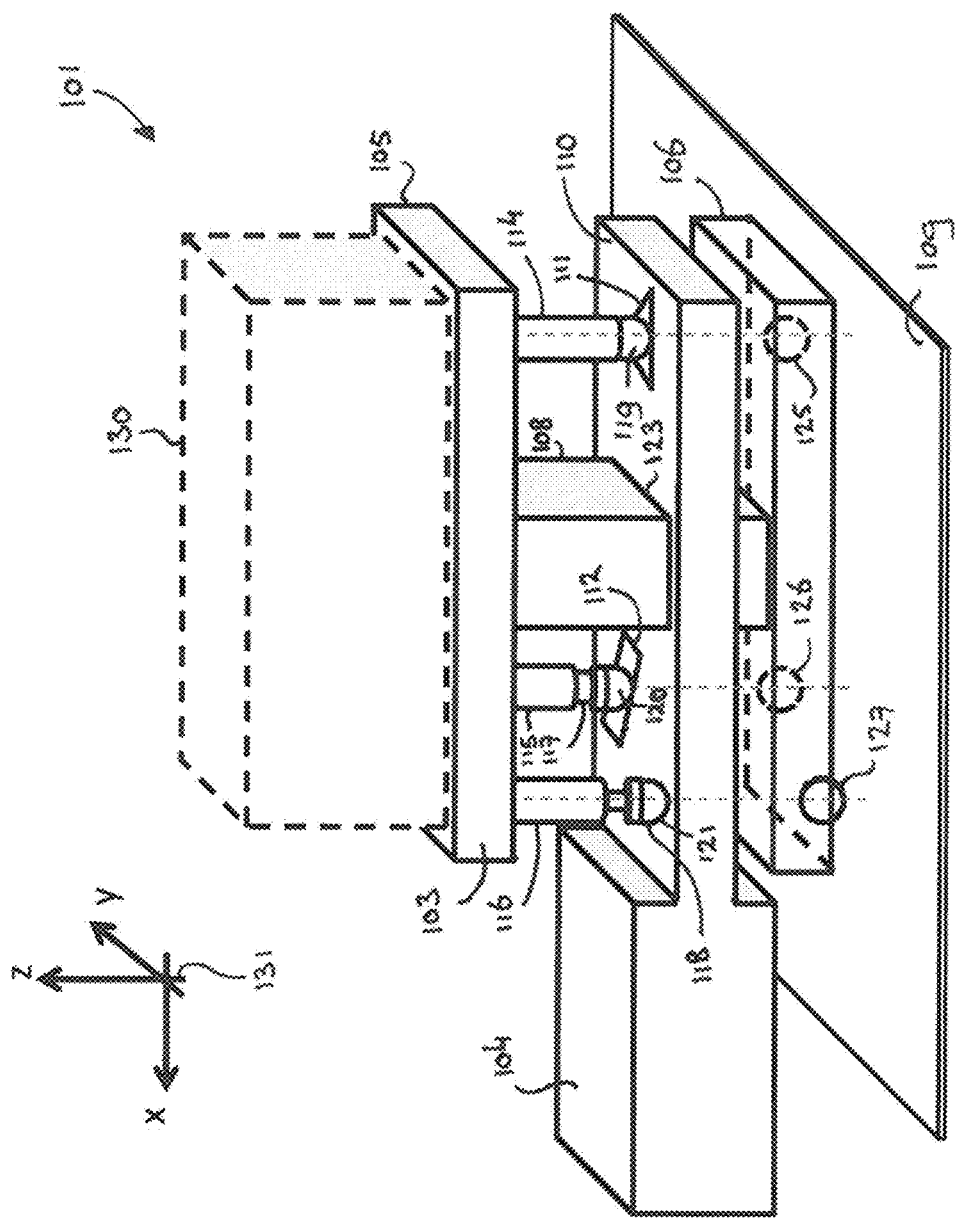
FIG. 4 schematically illustrates an interaction between a probe head and an extendible arm of a positioning structure in a system in accordance with the present invention.

In FIG. 4, an assembly 101 comprising an extendible arm 104 (e.g. similar to extendable arm 11 of FIG. 1) and a probe head carrier 103 is schematically illustrated. Instead of the extendible arm, other positioning structures may be applied, such as a rail guided frame or other placement structure. The probe head carrier 103 comprises an upper part 105 and a base 106. The base 106 is connected to the upper part 105 by means of an extension element 108. The upper part 105 of the carrier 103 is arranged for supporting the components of a probe head 130 of a scanning probe microscope device (i.e. the probe with cantilever 19 and probe tip 18, including a tip positioning detector 21), that is to be placed accurately at a specific landing position. The flat static carrier surface 109 onto which the carrier 103 is to be placed may be an encoder surface (similar to encoder surface 12 of FIG. 1) comprising an optical grating that cooperates with a positioning encoder (not shown) to very accurately determine the exact position of the carrier 103 relative to the flat static carrier surface 109. Such encoder surfaces are highly prone to scratching, and allow to determine the position of the carrier 103 at micrometer accuracy. The static carrier surface 109 is mounted to a metrology frame (not shown) of the SPM system.

The extendible arm 104 comprises a support surface 110. The support surface 110 comprises a first socket 111 and a second socket 112. A first socket 111 and a second socket 112, together with the support surface 110 itself, forms a kinematic mount for three pillars 114, 115, and 116 of the carrier 103. The pillars 114, 115, and 116 are connected to the upper part 105 of the carrier 103. The pillars 114, 115, and 116 extend in the direction of gravity towards the support surface 110 of the extendible arm 104. At the ends of the three pillars 114, 115, and 116, there are located spherical or semi-spherical pillar feet 119, 120 and 121 respectively. Each of the feet 119, 120 and 121 engages with the kinematic mount. To this end, pillar foot 119 engages in the first socket 111, pillar foot 120 engages in the second socket 112, and pillar foot 121 rests on the support surface 110 of the extendible arm 104. The second pillar 115 and the third pillar 116 also comprise flexible connections 117 and 118 respectively that allow a desired degree of bending such as to compensate for any friction forces during landing.

Extension element 108 extends through opening 123 of extendible arm 104. The base 106 is located at an opposite side of the extendible arm 104 with respect to the upper part 105. At the lower side of the base 106, three landing elements 125, 126 and 127 are located. It is noted that landing elements 125, 126 and 127 have been made visible in the schematic drawing of FIG. 4 although they are in reality located underneath the base 106 and would therefore be invisible from the view point taken. In FIG. 1, the assumed invisibility of these landing elements 125, 126 and 127 is suggested by drawing these elements with dotted lines. The first landing element 125 is associated with a first pillar 114. The first landing element 125 is aligned with the first pillar 114 in the direction perpendicular to the flat static carrier surface 109. Moreover, the second landing element 126 is associated with the second pillar 115, and is aligned with the second pillar 115 in a direction perpendicular to the flat static carrier surface 109 as well. Lastly, the third landing element 127 is associated with the third pillar 116, and is aligned with the third pillar 116 in the direction perpendicular to the flat static carrier surface 109. In the illustration of FIG. 1, the pillars 114, 115 and 116 are engaged in the kinematic mount (first socket 111, second socket 112 and support surface 110) and the base 106 is located above the flat surface 109. The directions x, y, and z are indicated by coordinate system 131.

The support surface 110 of the extension arm 104 comprises the sockets 111 and 112 of the kinematic mount. The first socket 111 is a tetrahedral shaped indentation in the surface 110 of the arm 104. Pillar foot 119 fits neatly in the first socket 111 preventing (when engaged) slipping of the foot 119 in any direction across the surface 110.

Surface 110 further includes a second socket 112 designed to receive pillar food 120 of the second pillar 115. Second socket 112 is a V-type groove in the support surface 110. The apex of the groove is aligned with a virtual line through the mid point of first socket 111 and the mid point of second socket 112. By this alignment of second socket 112, rotation around an axis through the first pillar 114 is effectively prevented, by preventing pillar foot 120 from moving in a direction perpendicular to a virtual line through sockets 111 and 112. The first socket 111 and the second socket 112 together constrain the degrees of freedom of translation of foot 119 across surface 110, and rotation of the carrier around the axis through the first pillar 114. The third pillar foot 121 rests on the support surface 110 without being constrained by a socket. As will be appreciated, movement of any of the feet 119, 120, and 121 in the z direction, i.e. the direction perpendicular to surface 109, is semi-constrained in the sense that the flat surface 110 prevents the feet 119-121 from moving below the surface 110, although movement in the upward direction (relative to surface 110) is of course possible for each of the feet 119-121.

Extending the extension element 108 will move the landing elements 125, 126 and 127 towards the substrate surface 109. When first landing element 125 touches the surface, the first pillar foot 119 of first pillar 114 will be released from socket 111 upon further extending the extension element 108. Pillar foot 120 will still be constrained in socket 112, and pillar foot 121 rests on support surface 110 of extendable arm 104. Upon further extension of extension element 108, the second landing element 126 touches the surface and pillar foot 120 consecutively is released from socket 112. Next, third landing element 127 lands on the surface 109, consecutively releasing pillar foot 121 from the support surface 110 of extendable arm 104. During placement of probe head carrier 103 onto the flat static carrier surface 109, the probe head carrier 103 is never over constrained, thereby preventing scratching of the delicate encoder surface 109. The present invention has been described in terms of some specific embodiments thereof. It will be appreciated that the embodiments shown in the drawings and described herein are intended for illustrated purposes only and are not by any manner or means intended to be restrictive on the invention. The context of the invention discussed here is merely restricted by the scope of the appended claims.

The invention claimed is:

1. Method of performing scanning probe microscopy on a substrate surface using a scanning probe microscopy system, the system including at least one probe head, the probe head comprising a probe tip arranged on a cantilever and a tip position detector for determining a position of the probe tip along a z-direction transverse to an image plane, the method comprising:
   positioning the at least one probe head relative to the substrate surface;
   moving the probe tip and the substrate surface relative to each other in one or more directions parallel to the image plane for scanning of the substrate surface with the probe tip; and
   determining the position of the probe tip with the tip position detector during said scanning for mapping nanostructures on the substrate surface;
   wherein said step of positioning is performed by placing the at least one probe head on a static carrier surface;
   wherein placing of the at least one probe head is performed by a positioning structure;
   wherein the or each probe head comprises a carrier cooperating with the positioning structure, said carrier or carriers comprising an upper part and a base which are connected to each other such as to be arranged remote from each other, wherein the positioning structure comprises a support surface arranged between the base and the upper part, the upper part comprising three engagement elements extending towards the support surface, wherein the base comprises three landing elements for supporting the at least one probe head on the static carrier surface, each landing element being associated with a respective one of the three engagement elements; and
   wherein prior to placement the three engagement elements rest on a plurality of sockets forming a kinematic mount on the support surface, wherein during placement of the or each probe head the landing elements are consecutively placed onto the static carrier surface such that each one of the engagement elements is released from the kinematic mount upon touch down of its associated landing element.

2. Method according to claim 1, wherein said step of positioning includes moving the probe head relative to the substrate surface in a direction parallel to the image plane towards a landing position using a positioning structure, wherein upon said placing of the probe head on the static carrier surface, said probe head is released from said positioning structure.

3. Method according to claim 1, wherein the static carrier surface is at least one of a group comprising: a surface of a metrology frame, a surface that is statically connected to a metrology frame, and/or a two-dimensional optical encoder surface.

4. Method according to claim 1, wherein said step of moving the probe tip and the substrate surface relative to each other is performed by moving of the substrate surface in a direction parallel with the image plane while maintaining the at least one probe head on the static carrier surface.

5. Method according to claim 1, wherein said step of moving the probe tip and the substrate surface relative to each other is performed by the probe head comprising an actuator for moving the cantilever relative to the probe head in a direction parallel to the image plane for performing the scanning of the substrate surface.

6. Method according to claim 1, wherein the step of positioning the at least one probe head includes placing each of a plurality of probe heads on a respective landing position on the static carrier surface.

7. Method according to claim 1, wherein for placement of the at least one probe head onto the static carrier surface the at least one probe head comprises one or more landing elements, and wherein the landing elements comprise at least one of a group comprising: bare landing feet, suction force clamps, magnetic clamps, or electrostatic clamps.

8. Scanning probe microscopy system for performing microscopy on a substrate surface, the system including at least one probe head, the probe head comprising a probe tip arranged on a cantilever and a tip position detector for determining a position of the probe tip along a z-direction transverse to an image plane,
    wherein the system comprises a positioning structure for positioning the at least one probe head relative to the substrate surface, wherein the system is further arranged for moving the probe tip and the substrate surface relative to each other in one or more directions parallel to the image plane for scanning of the substrate surface with the probe tip, and the system comprising a controller for receiving a signal provided by the tip position detector for determining the position of the probe tip with the tip position detector during said scanning for mapping nanostructures on the substrate surface,
    wherein for positioning of the at least one probe head, the positioning structure is arranged for placing the at least one probe head on a static carrier surface,
    wherein the or each probe head comprises a carrier cooperating with the positioning structure, said the or each carrier comprising an upper part and a base which are connected to each other such as to be arranged remote from each other, wherein the positioning structure comprises a support surface arranged between the base and the upper part, the upper part comprising three engagement elements extending towards the support surface, wherein the base comprises three landing elements for supporting the at least one probe head on the static carrier surface, each landing element being associated with a respective one of the three engagement elements, and
    wherein the three engagement elements cooperate with a plurality of sockets forming a kinematic mount on the support surface such as to be engaged with the kinematic mount prior to placement of the or each probe head, wherein the positioning structure is arranged hold the or each carrier in an angled orientation relative to the static carrier surface during placement such that the landing elements are enabled to be consecutively placed onto the static carrier surface such that each one of the engagement elements is released from the kinematic mount upon touch down of its associated landing element.

9. Scanning probe microscopy system in accordance with claim 8, further comprising an actuator for operating the positioning structure for moving the at least one probe head relative to the substrate surface in a direction parallel to the image plane towards a landing position.

10. Scanning probe microscopy system according to claim 8, wherein the positioning structure is arranged for cooperating with the at least one probe head such as to release the probe head from the positioning structure upon said placing of the probe head on the static carrier surface.

11. Scanning probe microscopy system according to claim 8, wherein the static carrier surface is at least one of a group comprising: a surface of a metrology frame of the system, a surface that is statically connected to a metrology frame of the system, and/or a two-dimensional optical encoder surface.

12. Scanning probe microscopy system according to claim 8, further comprising an actuated substrate holder arranged for holding the substrate surface and for moving of the substrate surface in a direction parallel with the image plane for performing said scanning of the substrate surface with the probe tip.

13. Scanning probe microscopy system according to claim 8, wherein the static carrier surface is an optical reference grid.

* * * * *